US006089022A

United States Patent [19]

Zednik et al.

[11] Patent Number: 6,089,022

[45] Date of Patent: Jul. 18, 2000

[54] REGASIFICATION OF LIQUEFIED NATURAL GAS (LNG) ABOARD A TRANSPORT VESSEL

[75] Inventors: Jay J. Zednik, Oakton; David L. Dunlavy, Fairfax, both of Va.; Thomas G. Scott, Austin, Tex.

[73] Assignee: Mobil Oil Corporation, Fairfax, Va.

[21] Appl. No.: 09/229,178

[22] Filed: Jan. 13, 1999

Related U.S. Application Data

[60] Provisional application No. 60/078,438, Mar. 18, 1998.

[51] Int. Cl.[7] .................... F03G 7/04

[52] U.S. Cl. .................... 60/641.7; 60/641.1

[58] Field of Search .................... 60/641.1, 641.6, 60/641.7

[56] References Cited

U.S. PATENT DOCUMENTS

| | | | |
|---|---|---|---|
| 2,938,359 | 5/1960 | Cobb, Jr. et al. . | |
| 3,386,257 | 6/1968 | Beazer . | |
| 3,663,644 | 5/1972 | Harvey . | |
| 3,775,976 | 12/1973 | Karig | 60/39.33 |
| 4,157,014 | 6/1979 | Clark, Jr. | 60/641.6 X |
| 4,276,927 | 7/1981 | Foust | 165/70 |
| 4,476,249 | 10/1984 | Avery | 60/641.7 X |
| 4,781,029 | 11/1988 | SerVaas | 60/641.7 |
| 5,199,266 | 4/1993 | Johansen . | |

OTHER PUBLICATIONS

"An Economic System for the Liquefaction, Transportation and Regas of Natural Gas using Surplus LNG Carries", No. 1, The Society of Naval Architects and Marinee Engineers, NY, NY, Sep. 27–26, 1984, pp. 17–1 thru 17–7.

"Concept Proposal for the Transporation and Regasification of Liquid Natural Gas", Argent Marine Operations, Inc., 1996.

"TRI–EX, Intermediate Fluid–Type Vaporizer", Kobe Steel, Ltd. Tokyo, Japan.

*Primary Examiner*—Hoang Nguyen

[57] ABSTRACT

A system and a method for regasifing LNG aboard a carrier vessel before the re-vaporized natural gas is transferred to shore. The pressure of the LNG is boosted substantially while the LNG is in its liquid phase and before it is flowed through a vaporizer(s) which, in turn, is positioned aboard the vessel. Seawater taken from the body of water surrounding said vessel is flowed through the vaporizer to heat and vaporize the LNG back into natural gas before the natural gas is off-loaded to onshore facilities.

5 Claims, 3 Drawing Sheets

REGASIFICATION OF LIQUEFIED NATURAL GAS (LNG) ABOARD A TRANSPORT VESSEL

CROSS-REFERENCE TO EARLIER APPLICATION

The present application claims the priority of Provisional Patent Application Ser. No. 60/078,438, filed Mar. 18, 1998.

DESCRIPTION

1. Technical Field

The present invention relates to the regasification of liquefied natural gas (LNG) aboard a sea-going, transport vessel before the LNG is transferred to shore as a gas and in one aspect relates to a system and method for regasifing LNG aboard the transport vessel before the revaporized LNG is transferred to shore wherein circulating seawater is used as the heat exchange medium for vaporizing the LNG aboard the vessel.

2. Background

Large volumes of natural gas (i.e. primarily methane) are produced in many remote areas of the world. This gas has significant value if it can be economically transported to market. Where the production area is in reasonable proximity to a market and the terrain between the two locations permits, the gas is typically transported through submerged and/or land-based pipelines. However, where the gas is produced in locations where laying a pipeline is infeasible or economically prohibitive, other techniques must be used in getting this gas to market.

Probably the most commonly used technique for getting remotely-produced gas to market involves liquefying the gas at or near the production site and then transporting the liquefied natural gas or "LNG" to market in specially-designed, storage tanks aboard a sea-going, carrier or transport vessel. The natural gas is compressed and cooled to cryogenic temperatures (e.g. −160° C.), thereby significantly increasing the amount of gas which can be carried in a particular storage tank. Once the vessel reaches its destination, the LNG is typically off-loaded, as a liquid, into onshore, storage tanks from which the LNG can then be revaporized as needed and transported as a gas to end users through pipelines or the like.

Where LNG markets are well established and the demand for natural gas is steady and on-going, the building and maintaining of permanent onshore storage and regasification facilities to service these markets is easily economically justified. Unfortunately, however, there are other potential markets for LNG which are short term, seasonal, or periodic in nature (i.e. "spot markets") which do not justify the building and maintaining of the required, permanent onshore facilities, due to the long lead times involved and the high costs related thereto. This results both in (a) depriving the potential customers in these markets of relative cheap energy and (b) lost sales to the natural gas producer.

Recently, it has been proposed to transport natural gas to market and then revaporize the LNG aboard the carrier vessel before the gas is off-loading into onshore pipelines; see "AN ECONOMIC SYSTEM FOR THE LIQUEFACTION, TRANSPORTATION, AND REGAS OF NATURAL GAS USING SURPLUS LNG CARRIERS", The Society of Naval Architects and Marine Engineers, No. 1, by Gary W. Van Tassel and John W. Boylston, presented at International Maritime Symposium, Waldorf Astoria Hotel, N.Y., Sep. 27–28, 1984; hereinafter referred to as the "Paper". In the method disclosed in the Paper, natural gas is compressed, cooled, and converted to LNG at a production site before it is loaded into the storage tanks of an available, commercial LNG carrier vessel which, in turn, is to be retrofitted with onboard vaporizers for onboard revaporizing the LNG once the vessel reaches its off-loading destination.

When the vessel reaches its destination, the LNG is withdrawn from the onboard storage tanks and its pressure is boosted by passing the LNG through booster pumps while the LNG is still in its liquid state. The LNG is then flowed through onboard vaporizers to revaporize the LNG into its gaseous state (i.e. natural gas) before the gas is flowed to shore and into pipelines for delivery to market. By using the tanks on the carrier vessel for storing the LNG at the off-loading site and then revaporizing the LNG before the gas is brought onshore, the need for expensive, onshore storage tanks and permanent regasification facilities at the off-loading site is eliminated. Also, since the pressure of the LNG is boosted onboard the vessel while it is still a liquid, the amount of compressor horsepower, otherwise needed in flowing the revaporized natural gas through the onshore pipelines, is greatly reduced if not eliminated altogether.

While regasifying LNG aboard its carrier vessel provides several recognized advantages as discussed above, the prior art systems proposed for regasifing the LNG aboard the vessel leaves much to be desired when safety and/or ecological concerns are considered. For example, the system described in the above cited Paper proposes to use steam from the ship's boilers as the heat-exchange medium in the onboard vaporizers for revaporizing the LNG. The live steam will needed to be piped to and through the vaporizers and will be under relatively-high pressure and at high temperatures presenting additional safety hazards to the ship and crew. Additionally, any condensate contamination will result in a multiday ship delay with extremely negative consequencies on the project operation and ecomonics.

Another recent proposal has been to use a steam-heated, water-eycol mixture as the heat-exchange medium for the onboard evaporators. Again, the steam would be taken from the ship's boilers which would require them to remain fired during the off-loading operation. Also, the piping of the live steam to various heat-exchangers on the vessel will again expose the crewmen to potential safety risks if a steam line should break or spring a leak. Further, due to the toxicity of glycol, its use poses a risk both to the safety of those handling the glycol aboard the ship and also to the surrounding environment in the event the lines carrying the glycol should rupture or leak during off-loading. Accordingly, a need exists for a system for revaporizing the LNG aboard the vessel which presents the minimum risks to both the crew and to the environment.

SUMMARY OF THE INVENTION

The present invention provides a system and a method for regasifying LNG aboard a carrier vessel before the re-vaporized natural gas is transferred to shore. Basically, this is done by flowing the LNG from the LNG storage tanks aboard the carrier vessel a vaporizer(s) which is positioned aboard said vessel. Seawater taken from the body of water surrounding said vessel is flowed through the vaporizer to heat the LNG within said vaporizer and to vaporize said LNG back into natural gas before the natural gas is transported from said vaporizer on said vessel to onshore facilities.

The LNG is boosted to a high pressure (e.g. 80–100 bars) while the LNG is in its liquid phase and before passing said LNG through said vaporizer. This allows the vaporized gas, which exits the vaporizer at substantially the same pressure, to flow to shore and on through onshore pipeline to designated facilities without requiring any further substantial compression. The seawater used in the vaporizers is taken from the body which surrounds the vessel through an inlet and is discharged from said vaporizer back into the body of water at a point through an outlet which is spaced from the inlet (e.g. at least 18 meters) so that the cooled discharged water is not recirculated through the vaporizer.

The system for carrying out the present invention basically comprised of a vaporizer train(s) aboard the carrier vessel which is adapted to receive and vaporize the LNG from the storage tanks aboard the vessel once the vessel is moored at its off-loading destination. Each vaporizer train is comprised of a booster pump which receives LNG from the storage tanks and raises the pressure of the LNG before it is passed through a vaporizer which, in turn, is positioned aboard the vessel. The vaporizer is comprised of a housing having an inlet and an outlet for flowing seawater through the vaporizer to heat the LNG and vaporize it back to natural gas before its exits the vaporizer. The inlet of the vaporizer is adapted to receive seawater directly from the body of water surrounding said vessel while the outlet is adapted to discharge the seawater back into said body of water after the seawater has passed through the vaporizer. The inlet and the outlet of the vaporizer are spaced from each other at a distance (e.g. at least 18 meters) to prevent the recirculation of the cold, discharged seawater.

By boosting the pressure of the LNG while it is still a liquid and then regasifying the LNG aboard the carrier vessel before it is off-loaded from the vessel into onshore facilities, the need for onshore storage tanks and large amounts of compressor horsepower is eliminated thereby opening new markets for the LNG. Further, by using seawater as the primary heat exchange medium for the onboard vaporizers, the present invention provides a safe and environmental-friendly method and system which presents minimal risks to both the crewmen and operators during off-loading.

BRIEF DESCRIPTION OF THE DRAWINGS

The actual construction operation, and apparent advantages of the present invention will be better understood by referring to the drawings, not necessarily to scale, in which like numerals identify like parts and in which.

BEST KNOWN MODE FOR CARRYING OUT THE INVENTION

Figure 1:
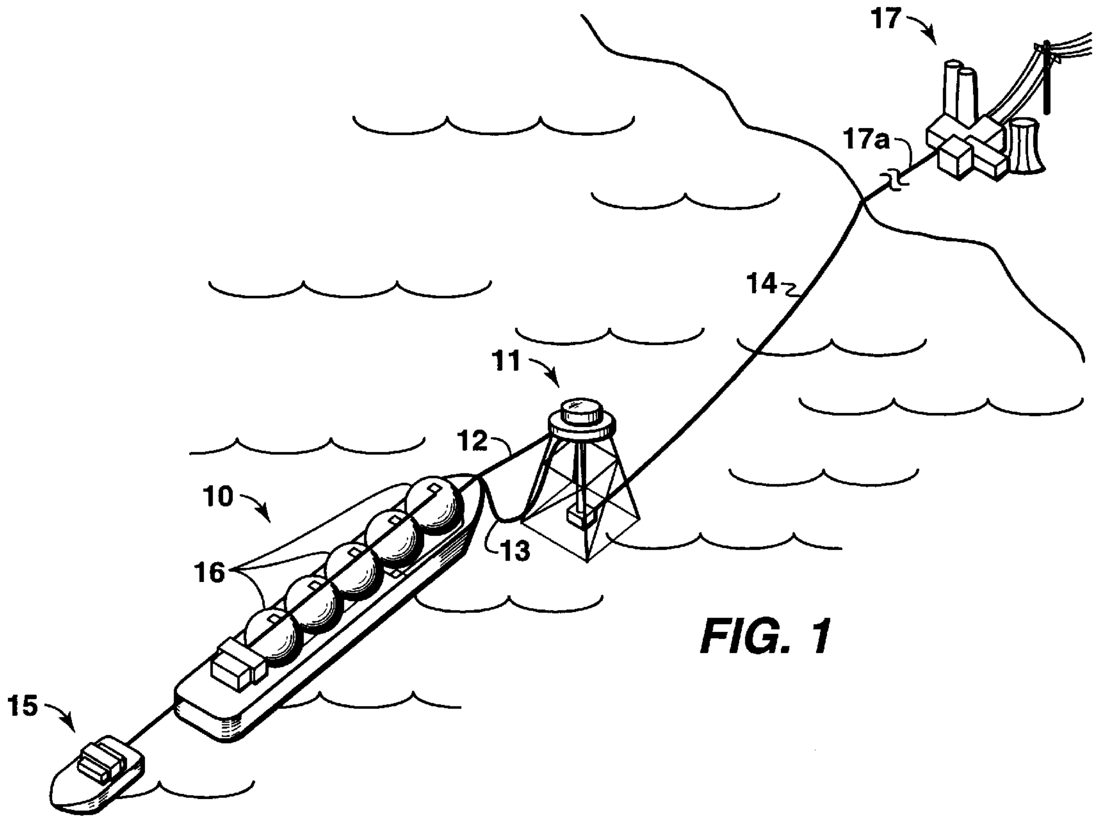
FIG. 1 is an illustration of a typical LNG carrier vessel retrofitted in accordance with the present invention as it is moored at an off-loading terminal.

Referring more particularly to the drawings, FIG. 1 illustrates a sea-going, liquefied natural gas (LNG) carrier vessel 10 moored at its off-loading destination. As shown, vessel 10 is secured to an off-shore, bottom supported mooring structure or platform 11 by hawser 12 and is maintained in a "weather-vaned" position by a tugboat 15 or the like during the off-loading operation. An off-loading, transfer line 13 from vessel 10 is fluidly connected through a swivel or the like on moor 11 to submerged pipeline 14 which, in turn, transports the cargo from vessel 10 to an onshore pipeline 17*a* which, in turn, passes the gas on to the end use facilities 17.

As will be understood by those skilled in the art, it is common practice to compress and cool natural gas at or near a production area to form liquefied natural gas (LNG) which is then transported to market in specially-designed storage tanks 16 aboard vessel 10. Typically, when vessel 10 reaches its destination, it is moored to a pier 11 and the LNG is off-loaded in its liquid state onto shore where it is stored and/or revaporized before sending it on to end users as a gas. This requires the building and maintaining of onshore storage and compressor facilities which, due to the time and expense involved, may cause many small or spot markets to go unserviced.

In accordance with the present invention, the LNG from tanks 16 is revaporized aboard vessel 10 before it is off-loaded from the vessel into onshore pipeline 17*a* as a gas. This eliminates the need for onshore storage tanks and significantly reduces, if not eliminates, the compressor horsepower required for getting the gas to the end users.

Figure 2:
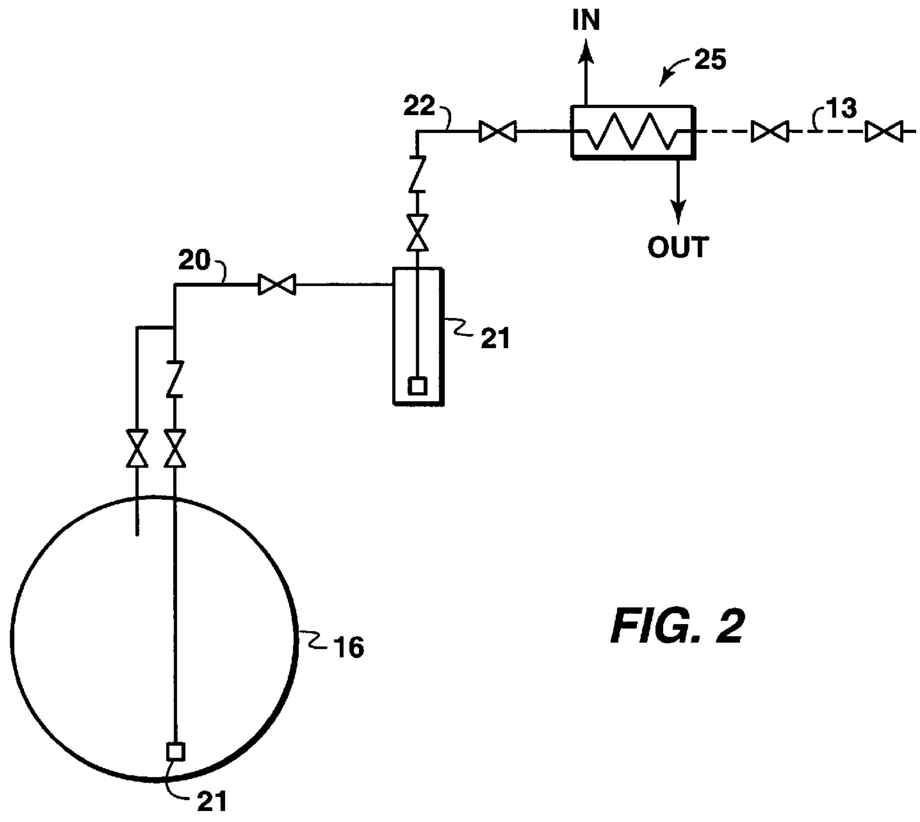
FIG. 2 is a simplified schematical flow diagram of the onboard, regasification system of the present invention is.

The system for carrying out this onboard revaporization of the LNG in accordance with the present invention is schematically illustrated in FIG. 2. Typically, the LNG is stored in tank(s) 16 as a liquid under atmospheric pressure and at a temperature of around −162° C. Once vessel 10 is securely moored at moor 11 and transfer line 13 is properly connected, LNG is pumped by submerged pump 18 from tank 16 through line 20 and is delivered to a booster pump 21 at a pressure of about 6 bars. Booster pump 21, in turn, significantly raises the pressure of the LNG (e.g. to 80–100 bars) before it is passed on to vaporizer 25 through line 22. Vaporizer 25, which uses ecologically-friendly seawater as the heat exchange medium, vaporizes the LNG back into natural gas before it is flowed to shore through transfer line 13 and submerged pipeline 14 (FIG. 1).

Figure 6:
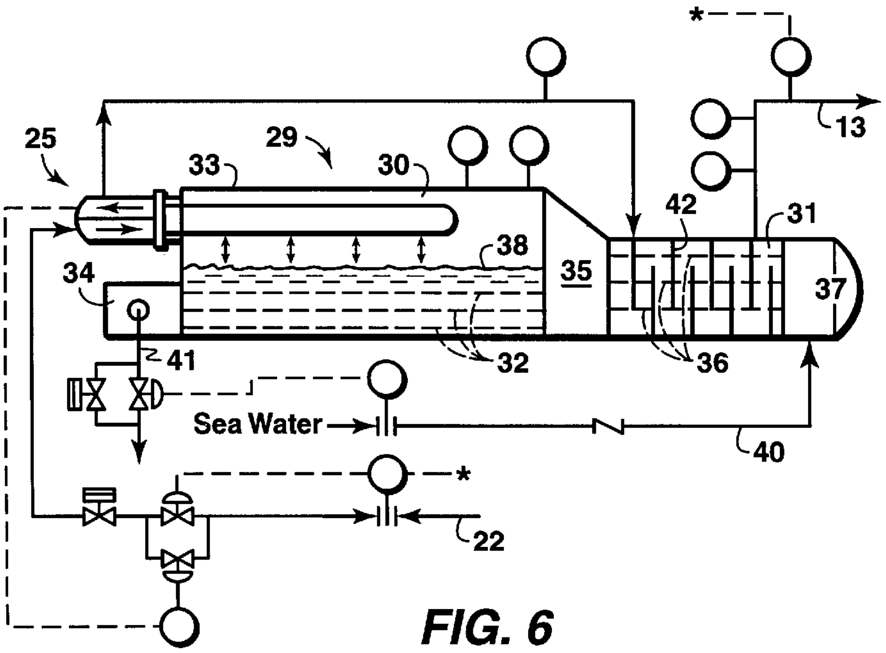
FIG. 6 is an enlarged view of the vaporizer illustrated for use in the present system.

Various types of vaporizers, which are capable of using seawater as the principal heat exchange medium, can be used in the present invention; for example "TRI-EX" Intermediate Fluid-Type LNG Vaporizer, available from Kobe Steel, Ltd., Tokyo, Japan. This type of vaporizer is illustrated in FIG. 6 and is comprised of a housing 29 having a pre-heat section 30 and a final heating section 31. Pre-heat section 30 has a plurality of pipes 32 running therethrough which fluidly connect the manifolds 34 and 35 which lie at either end of section 30 while final heating section 31 has a plurality of pipes 36 therethrough which fluidly connect manifolds 35, 37 which lie at either end of section 31.

Seawater, which is collected directly from the sea surrounding vessel 10, is pumped into manifold 37 through intake or inlet line 40. The seawater flows through pipes 36 in final heating section 31 and into manifold 35 before flowing through pipes 32 in pre-heat section 30 and into manifold 34, from which the seawater is then discharged back into the sea through outlet line 41.

In operation, the LNG from booster pump 21 flows through inlet line 22 and into a looped conduit 33 which is positioned within the pre-heat section 30 of vaporizer 25 which, in turn, contains a "permanent" bath 38 of an evaporative coolant (e.g. propane) in the lower portion thereof The seawater, flowing through pipes 32, will "heat"

the propane in bath 38 causing the propane to evaporate and rise within precooling section 30. As the propane gas contacts looped conduit 33, it give up heat to the extremely cold LNG flowing therethrough and recondenses to drop back into bath 38 thereby providing a continuous, circulating "heating" cycle of the propane within pre-heat section 30.

After the LNG is "heated" in coiled conduit 33 with pre-heat section 30 flows through line 41 into final heating section 31. Baffles 42 in section 31 force the LNG to flow through a tortuous path and in contact with pipes 36 wherein heat from the seawater in pipes 36 is exchanged with the LNG to complete the vaporization of the LNG before its exits the evaporator 25 through transfer line 13 at a temperature about 10° C. cooler than the temperature of the seawater and at a pressure in the range of about 80–100 bars, depending on the particular conditions involved.

Figure 3:
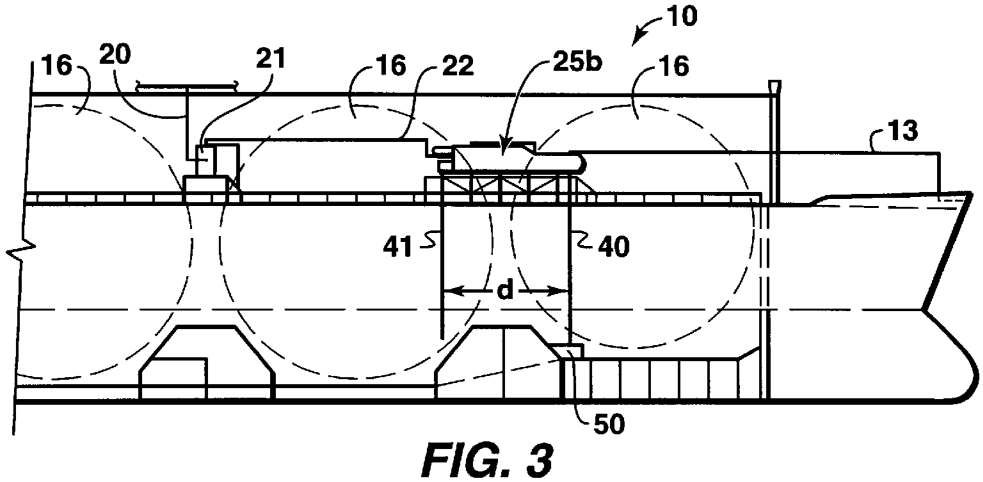
FIG. 3 is a side view, partly broken away of the vessel of FIG. 1.
Figure 4:
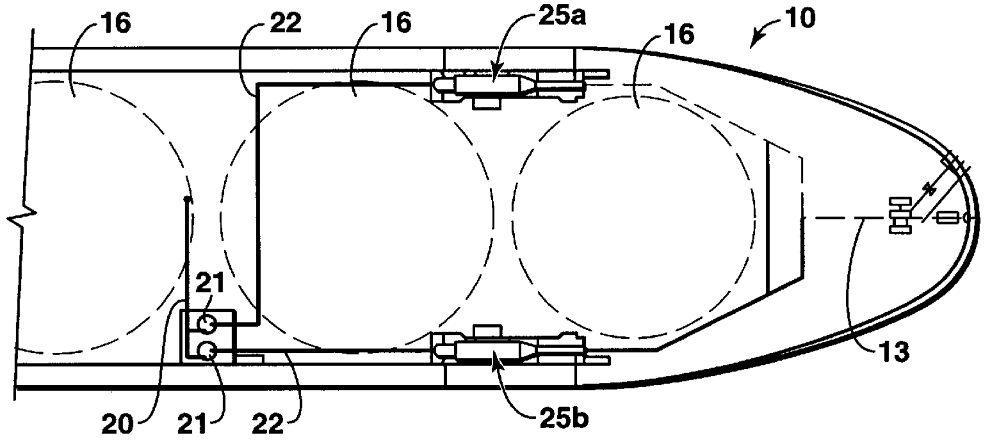
FIG. 4 is a plan view of FIG. 3.
Figure 5:
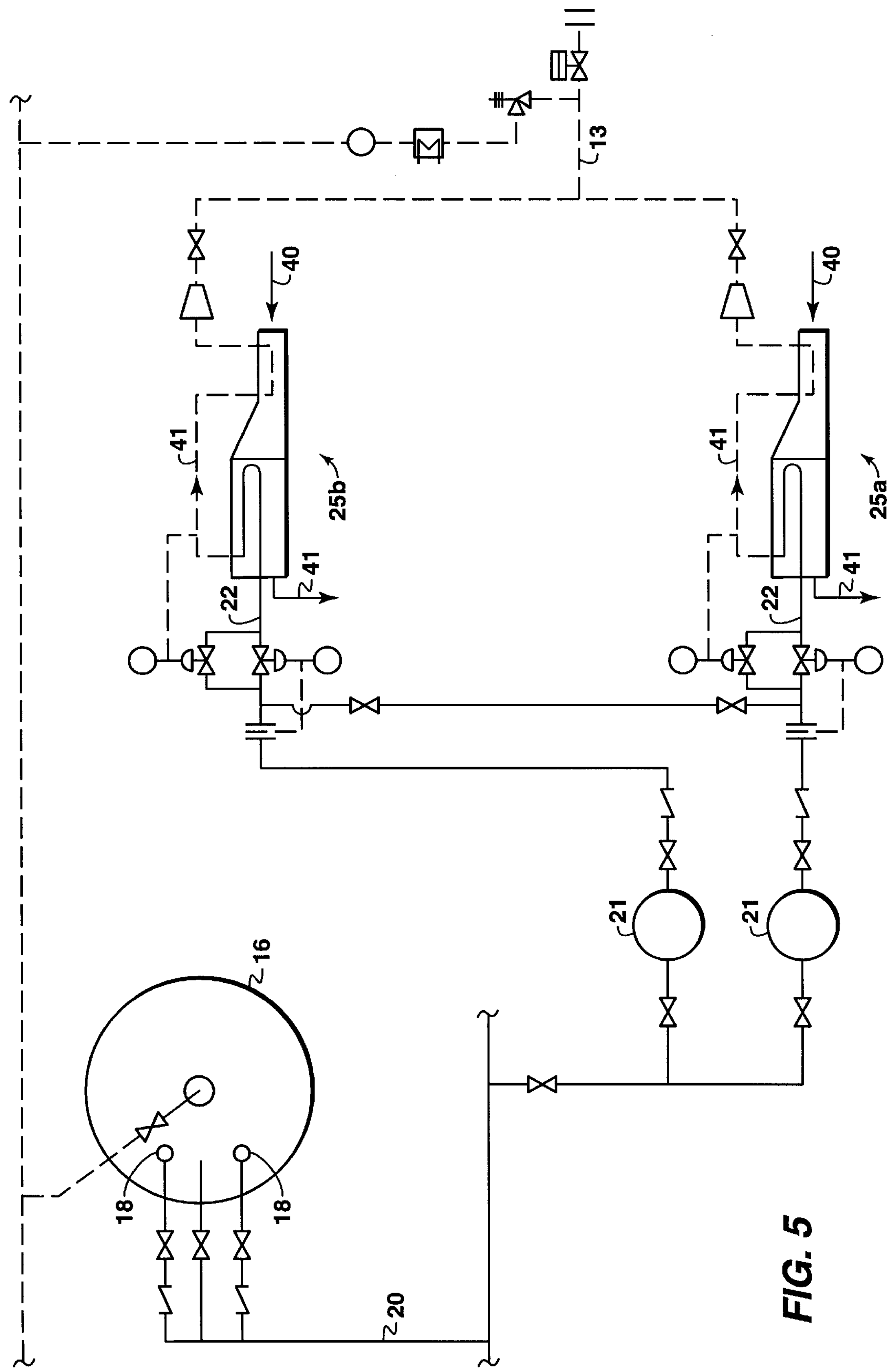
FIG. 5 is an expanded schematical flow diagram of the system of FIG. 2.

Referring to FIGS. 3–5, a more detailed layout of an actual system in accordance with the present invention is illustrated as it may be retrofitted or originally installed on a typical LNG vessel 10. The system disclosed in these figures is comprised of a plurality (e.g. two) of individual vaporizer trains 25*a*, 25*b*. Each separator train 25*a*, 25*b*, respectively, has basically the same construction and operates in the same manner as that described above. The trains are positioned on opposite sides of vessel 10 (see FIG. 4) and operate in parallel with the outputs from both of the vaporizer trains 25*a*, 25*b* being fluidly connected into transfer line 13 for transferring the vaporized natural gas to shore.

Referring now more particularly to FIG. 3, the inlet 40 of vaporizer 25 is fluidly connected to "sea chest" 50 which is positioned below the waterline to collect seawater therein. The outlet 41 is spaced at a sufficient distance "d" (e.g. at least 18 meters) from the inlet 40 so that the "cooled" water which is being discharged through outlet 41 will not be drawn back into the sea chest 50. This prevents the significantly colder water from outlet 41 (i.e. water which has been heat-exchanged within vaporizer 25) from being recycled through the vaporizer which, if done, could substantially reduce the heating efficiency of the vaporizer.

It can be seen that by using seawater as the heat exchange medium for regasifying LNG aboard a carrier vessel before transferring the re-vaporized natural gas to shore facilities, the present invention provides a safe and ecologically-friendly system which poses almost no threat to the environment.

What is claimed is:

1. A method for regasifying liquefied natural gas (LNG) aboard a LNG carrier vessel before the LNG is off-loaded as a gas, said method comprising:

flowing said LNG from storage tanks aboard said carrier vessel for storing LNG during transport through a vaporizer which is positioned aboard said vessel;

boosting the pressure of said LNG while in its liquid phase before passing said LNG through said vaporizer;

withdrawing seawater from the body of water surrounding said vessel at a first point and flowing said seawater through said vaporizer to heat said LNG within said vaporizer and to vaporize said LNG back into natural gas; and discharging said seawater from said vaporizer back into said body of water at a second point which is spaced from said first point at a distance sufficient to prevent said discharged seawater from being recycled through said vaporized;

transferring said natural gas from said vaporizer of said vessel to onshore facilities.

2. The method of claim 1 wherein said pressure of said LNG is boosted to a pressure in the range of 80–100 bars before the LNG is passed through said vaporizer.

3. The method of claim 1 wherein said distance between said first point and said second points is at least about 18 meters.

4. The method of claim 1 wherein said distance between said inlet and said outlet is at least about 18 meters.

5. A system for regasifying liquefied natural gas (LNG) aboard a LNG carrier vessel before the LNG is off-loaded as a gas, said system comprising:

storage tanks aboard said carrier vessel for storing LNG during transport;

a vaporizer positioned aboard said vessel and adapted to receive LNG from said storage tanks for vaporizing said LNG back into natural gas; said vaporizer comprising:

a housing having an inlet and an outlet, said inlet adapted to receive seawater directly from the body of water surrounding said vessel and said outlet adapted to discharge the seawater after said seawater has passed through said vaporizer back into said body of water wherein said inlet and said outlet are spaced at a distance sufficient to prevent said discharged seawater from being recycled through said vaporizer;

means for boosting the pressure of said LNG while in its liquid phase before passing said LNG through said vaporizer; and a transfer line fluidly connected to said vaporizer to transport said natural gas from said vaporizer on said vessel to onshore facilities.

* * * * *

US006089022C1

(12) EX PARTE REEXAMINATION CERTIFICATE (6131st)

United States Patent

Zednik et al.

(10) Number: US 6,089,022 C1

(45) Certificate Issued: Feb. 26, 2008

(54) REGASIFICATION OF LIQUEFIED NATURAL GAS (LNG) ABOARD A TRANSPORT VESSEL

(75) Inventors: Jay J. Zednik, Oakton, VA (US); David L. Dunlavy, Fairfax, VA (US); Thomas G. Scott, Austin, TX (US)

(73) Assignee: Mobil Oil Corporation, Fairfax, VA (US)

Reexamination Request:
No. 90/008,336, Jan. 18, 2007

Reexamination Certificate for:

| | |
|---|---|
| Patent No.: | **6,089,022** |
| Issued: | **Jul. 18, 2000** |
| Appl. No.: | **09/229,178** |
| Filed: | **Jan. 13, 1999** |

Related U.S. Application Data

(60) Provisional application No. 60/078,438, filed on Mar. 18, 1998.

(51) Int. Cl.

| | |
|---|---|
| ***F17C 9/02*** | (2006.01) |
| ***F17C 9/00*** | (2006.01) |
| ***F03G 7/04*** | (2006.01) |

(52) U.S. Cl. ..................................... 60/641.7; 60/641.1

(58) Field of Classification Search ................ 60/641.1, 60/641.6, 641.7

See application file for complete search history.

(56) References Cited

U.S. PATENT DOCUMENTS

| | | | | |
|---|---|---|---|---|
| 2,795,937 | A | 6/1957 | Sattler | 62/1 |
| 2,975,607 | A | 3/1961 | Bodie | 62/52 |
| 3,766,583 | A | 10/1973 | Phelps | 9/8 |
| 3,864,918 | A | 2/1975 | Lorenz | 60/651 |
| 4,054,433 | A | 10/1977 | Buffiere et al. | 62/13 |

OTHER PUBLICATIONS

D. Berti et al. "LNG Offshore Import Terminal: A Technology Challenge," Offshore Mediterranean Conference 1995/.

G.W. Van Tassel, "An Economic System for the Liquefaction, Transportation and Regas of Natural Gas using Surplus LNG Carries," No. 1, The Society of Naval Architects and Marinee Engineers, NY, NY, Sep. 27–26, 1984, pp. 17–1 thru 17–7.

J.W. Boylston, "Concept Proposal for the Transportation and Regasification of Liquid Natural Gas," Argent Marine Operations, Inc., 1996.

*Primary Examiner*—Sara Clarke

(57) ABSTRACT

A system and a method for regasifing LNG aboard a carrier vessel before the re-vaporized natural gas is transferred to shore. The pressure of the LNG is boosted substantially while the LNG is in its liquid phase and before it is flowed through a vaporizer(s) which, in turn, is positioned aboard the vessel. Seawater taken from the body of water surrounding said vessel is flowed through the vaporizer to heat and vaporize the LNG back into natural gas before the natural gas is off-loaded to onshore facilities.

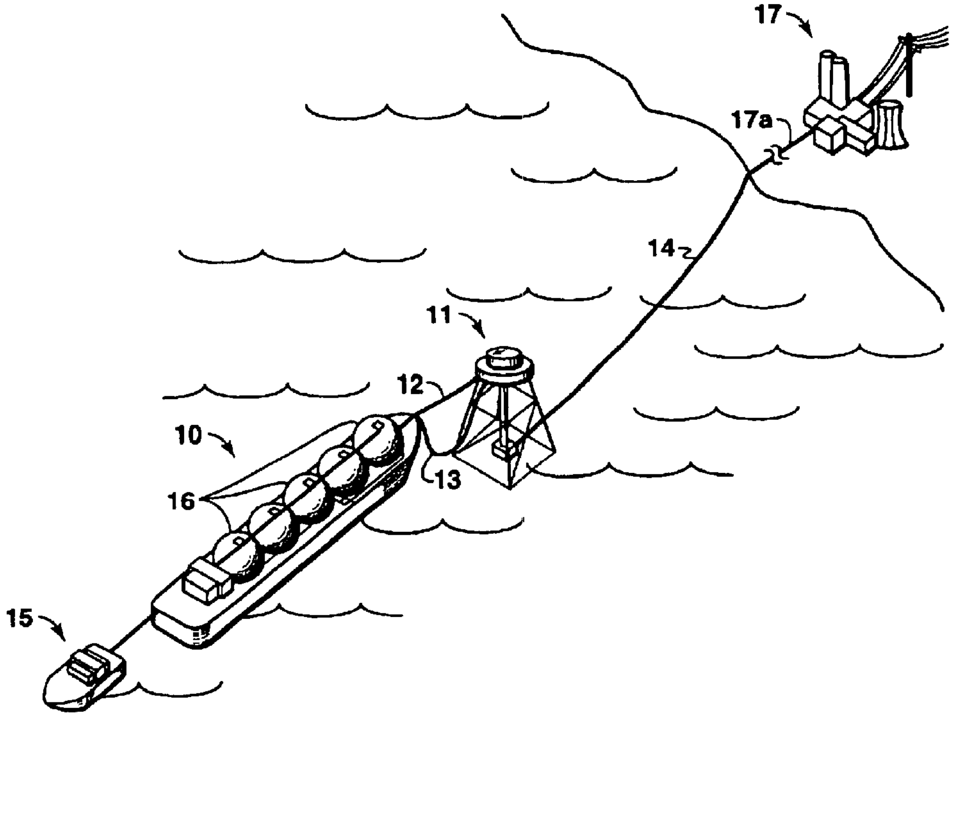

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *